United States Patent Office 3,498,265
Patented Mar. 3, 1970

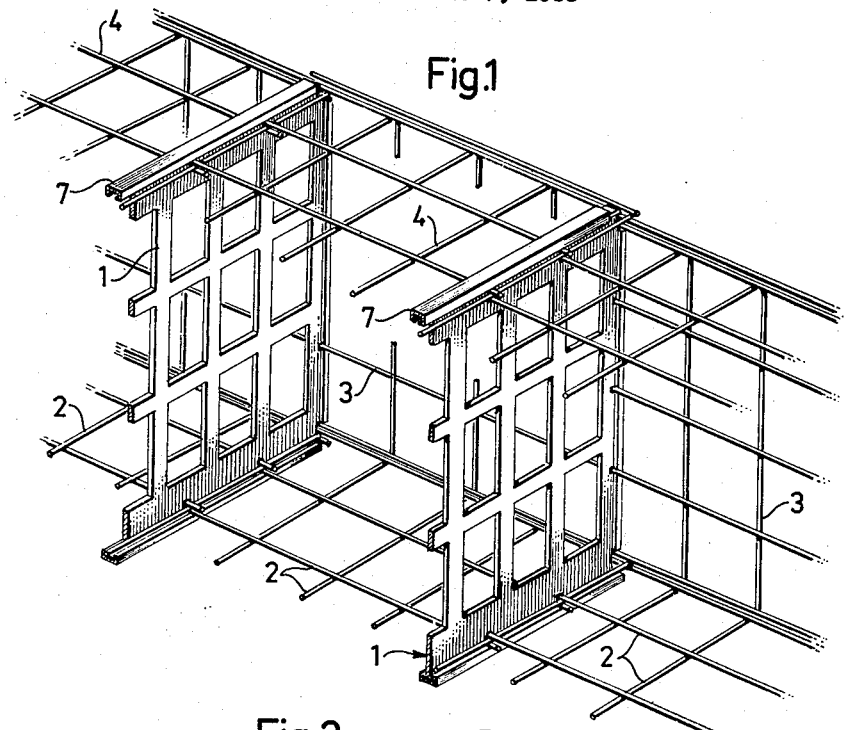
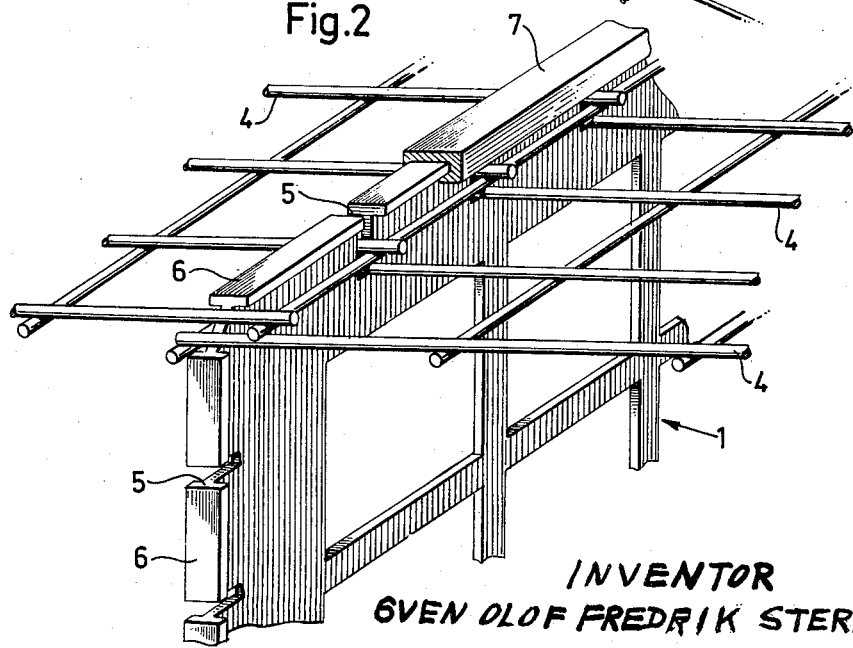

3,498,265
WALL STRUCTURE FOR CAGES
Sven Olof Fredrik Sterner, Varnamo, Sweden, assignor to AB Overlidasystem, Varnamo, Sweden, a company of Sweden
Filed June 7, 1968, Ser. No. 735,300
Claims priority, application Sweden, June 9, 1967, 8,110/67
Int. Cl. A01k 31/06
U.S. Cl. 119—17       6 Claims

ABSTRACT OF THE DISCLOSURE

In a wall structure comprising a grid type wall including grid members and an element abutting said wall on one side thereof and connected thereto a plurality of recesses are provided in the abutting element receiving the grid members and a portion of the element projects on the other side of the wall and is provided with a detachable locking member closing the recesses to retain the grid members therein.

---

The present invention relates to a wall structure for netting and grating cages.

It is known to build cage structures for hens and other minor domestic animals from walls including elongated grid bars in the nature of rows of composite cages, wherein the partitions between adjacent cages are common.

The object of the invention is to provide a simple and reliable means for connecting the cage walls with each other and in particular for connecting abutting partitions between the cages and the walls at the ends of the cage rows with the netting or grating walls of the cages, but also for permitting connection of other members with the netting or grating walls According to the invention there is provided in a wall structure comprising a grid type wall including elongated grid members and an element abutting said wall on one side thereof and connected thereto, means on said abutting element forming a plurality of recesses receiving at least some of said grid members, said means projecting on the other side of said wall, a locking member and interengaging means on said means forming said recesses, said locking member being detachably connected to said interengaging means on said other side of said wall and closing said recesses to retain said grid members therein.

In a preferred embodiment of the invention said interengaging means comprises a portion of T-shaped cross-section and said locking member defines an undercut T-shaped groove in order to be pushed onto the T-shaped portion of the member.

According to the invention there is also provided a cage comprising front and rear walls including elongated grid members and at least two spaced side walls abutting said front and rear walls on one side thereof and connected thereto, edge portions on said side walls forming a plurality of recesses receiving at least some of said grid members, said edge portions projecting on the other side of said front and rear walls, a locking member and interengaging means of each of said projecting edge portions of said side walls, said locking member being detachably connected to said interengaging means on said other side of said front and rear walls and closing said recesses to retain said grid members therein.

The invention will be described in more detail in the following with reference to the accompanying drawings, in which:

FIG. 1 is a fragmentary perspective view of a cage structure built by means of the device according to the invention, and FIG. 2 shows on a larger scale, the connection of two netting sections with each other and with a partition in a cage structure according to FIG. 1.

FIG. 1 shows a portion of a cage structure formed from a row of cages suspended beside each other. The cage structure consists in its main parts of partitions 1 which preferably consist of plastic and are provided with a netting pattern, of end walls (not shown) for the row of cages constructed in the same way as the partitions, and of netting sections which by means of the device according to the invention are detachably secured to the edges of the end walls and the partitions. The netting sections for each cage consist of a bottom section 2, a rear section 3, a roof section 4 and a front section (not shown). The front section may be dispensed with if the cage structure has on its front side supports for water or feed troughs or other means which will delimit the cages on this side in a satisfactory manner.

The edges of the partitions 1 and also of the end walls (not shown) are provided with recesses 5 spaced from each other a distance corresponding to the distance between the bars of the netting sections which extend transversely of the partitions and the end walls. Furthermore, the edges of the partitions 1 and the end walls are provided with a projecting portion 6 of T-shaped cross-section.

At the construction of the cage structure the bars of netting sections 2, 3 and 4 extending transversely of the end walls and the partitions are introduced into the recesses 5 in such a way that a bar parallel to the end walls and the partitions 1 will be located on that side of the partition 1 which is opposite to the rest of the section. Netting sections 2, 3 and 4 will consequently overlap at the partitions so that the edge bars of two netting sections connected to the edge of a parittion 1, when these sections are pulled apart, will each rest against one side surface of the edge portion of the partition. Thereupon, netting sections 2, 3 and 4 are locked to the partition 1 by a strip 7 which has a groove 8 of a cross-section corresponding to the T-shaped edge portion of the partition being pushed inwardly over the grid bars along the T-shaped portion 6 in order to retain the bars of the netting sections in the recesses 5.

After a row of cages of the desired size has been built it is preferably suspended by means of supporting arms and rods, in which case the rods are threaded through apertures provided in the end walls and the partitions and are then allowed to rest on the supporting arms which are mounted in cantilever fashion on a wall or the like. After the row of cages has been suspended on the supporting arms and the rods the cages are pulled apart so that the edge bars of the netting sections will be pressed against the side surfaces of the edge portions of the partitions 1, whereupon the cages are fixed in this position.

It is also possible to change the size of the various cages, although the netting sections have the same size, by letting the sections overlap more or less at the partitions.

By means of the device according to the invention it is possible to build cage structures in the desired manner, in which case the material for these may be delivered in the nature of netting sections, partitions and end walls, locking strips and other fittings and can then be assembled at the site.

The device according to the invention may also be used in order to lock additional equipment for the cage structure to the cage walls.

What I claim and desire to secure by letters Patent is:
1. In a wall structure comprising a grid type wall in- cluding elongated grid members and an element abutting said wall on one side thereof and connected thereto, means on said abutting element forming a plurality of recesses receiving at least some of said grid members, said means projecting on the other side of said wall, a locking member and interengaging means on said means forming said recesses, said locking member being detachably connected to said interengaging means on said other side of said wall and closing said recesses to retain said grid members therein.

2. In a wall structure as claimed in claim 1, said abutting element comprising a wall member and an edge portion of said wall member constituting said means forming said recesses.

3. In a wall structure as claimed in claim 1, said interengaging means comprising a portion having a T-shaped cross-section and said locking member defining an undercut groove of a cross-section corresponding to said T-shaped portion, said locking member being slidable onto said T-shaped portion.

4. A cage comprising front and rear walls including elongated grid members and at least two spaced side walls abutting said front and rear walls on one side thereof and connected thereto, edge portions on said side walls forming a plurality of recesses receiving at least some of said grid members, said edge portions projecting on the other side of said front and rear walls, a locking member and interengaging means on each of said projecting edge portions of said side walls, said locking member being detachably connected to said interengaging means on said other side of said front and rear walls and closing said recesses to retain said grid members therein.

5. A cage as claimed in claim 4, comprising wall sections constituting said front and rear walls, each of said sections extending between two adjacent side walls and having at least at those portions which are connected to said interengaging means grid members parallel to said side walls and engaging that side surface of said edge portion which is opposite to the rest of the section.

6. A cage as claimed in claim 4, said interengaging means comprising a portion having a T-shaped cross-section and said locking member defining an undercut groove of a cross-section corresponding to said T-shaped portion, said locking member being slidable onto said T-shaped portion.

References Cited

UNITED STATES PATENTS

| | | | |
|---|---|---|---|
| 1,511,815 | 10/1924 | Markow | 245—2 |
| 1,863,982 | 6/1932 | Hatch | 119—17 |
| 2,799,244 | 7/1957 | Dorsey | 119—17 |

ALDRICH F. MEDBERY, Primary Examiner

U.S. Cl. X.R.

119—19